O. TROUPENAT.
SAFETY DEVICE FOR SAWS.
APPLICATION FILED MAY 25, 1910.
997,720.
Patented July 11, 1911.
2 SHEETS—SHEET 2.
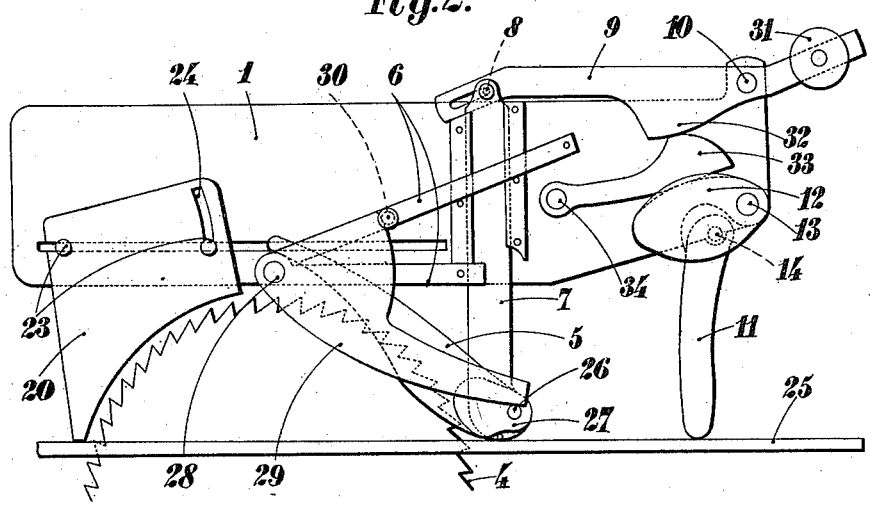
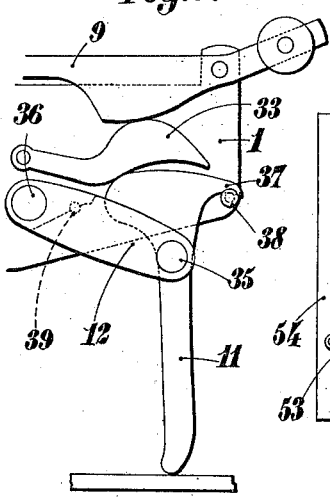
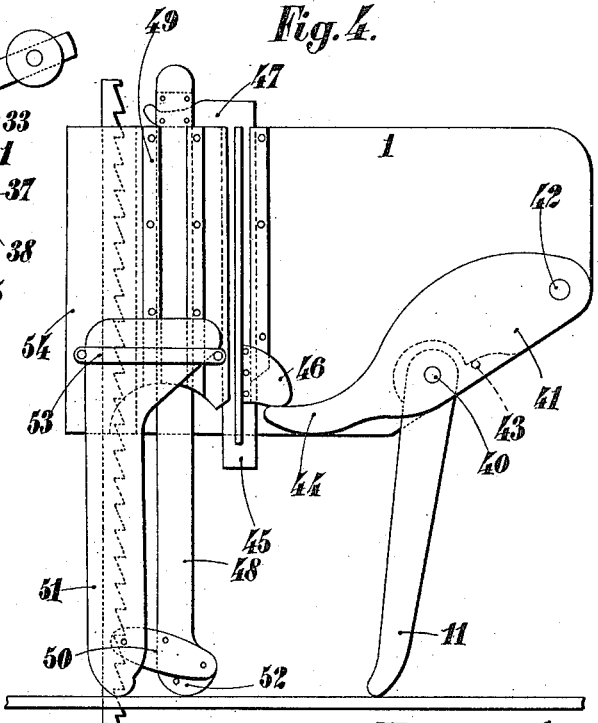
Witnesses
Inventor
Othon Troupenat

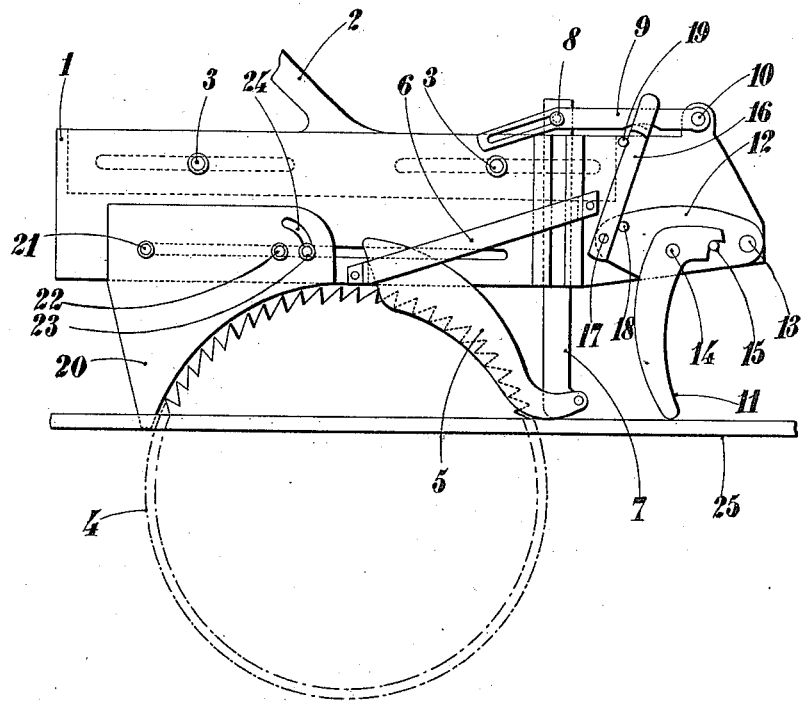

UNITED STATES PATENT OFFICE.

OTHON TROUPENAT, OF BEAUVAIS, FRANCE.

SAFETY DEVICE FOR SAWS.

997,720.  Specification of Letters Patent.  Patented July 11, 1911.

Application filed May 25, 1910. Serial No. 563,332.

*To all whom it may concern:*

Be it known that I, OTHON TROUPENAT, a citizen of the French Republic, residing at Beauvais, Department of the Oise, in France, have invented certain new and useful Improvements in Safety Devices for Saws, of which the following is a specification.

The invention has for its object a safety device for saws. This device, generally speaking, comprises a plate coöperating with the saw and one or several movable guards, according to the conditions, which are located on the sides of the saw; the slides or protecting guards are automatically raised, when it is desired to saw a piece of wood or other material. The protecting guards are automatically raised by the action of a system of levers in relation with a finger or lever placed in front of the slide and the saw which is raised by the piece of work at the beginning of the operation and liberated at its termination.

In the accompanying drawings: Figure 1 shows a form of construction of a safety device for circular saws. Fig. 2 is a modification of the device shown in Fig. 1. Fig. 3 shows certain modifications which can be made in the protective device when it is intended to operate in certain conditions either with or without a guide. Fig. 4 shows a form of construction of the safety device when it is applied to band saws and reciprocating saws.

The device, as shown in Fig. 1, comprises a plate 1 situated above the saw 4 and connected by means of an arm 2 to a supporting column, the attachment being made by means of bolts 3. Upon the side of the saw is located a guard 5 which can move between the plate 1 and the guide band 6. The guard 5 is pivoted to a slide 7 which moves in a guide on the plate 1. Near the top of the slide 7 there is a pin 8 which moves in a longitudinal slot in an arm 9 pivoted at 10 to the plate 1. An operating lever 11 is pivoted at 13 to the plate 1. The lever when in its position of rest is in contact with the table 25 of the saw. The link 12 carries a pin 15 which determines its movement when the lever 11 is moved toward the saw. Upon the link 12 an arm 16 is pivoted at 17, the free end of which is forked where it engages with the lever 9. Pins 18 and 19 carried upon the link 12 and plate 1 respectively serve as guides for the arm 16. The device also comprises a dividing knife 20 located in the same plane as the saw. This knife is connected to plate 1 by means of three bolts 21, 22, 23, the latter engaging in a curved slot 24 in the knife 20.

The operation of the device is as follows: When it is desired to place a piece of work in position it is sufficient to push it in the direction of the saw. The lever 11 is thereby raised and acting upon the link 12 and arm 16 raises the lever 9 of the slide 7. The guard 5 is thus raised and the workman can bring the work against the teeth at the precise place where the cut is to be made. While the piece of work is being moved in the direction of the saw the lever 11 rests upon the top of the same and the slide 7 remains raised permitting the workman to see the path to be followed. When the piece of work has been nearly sawed through, it passes the lever 11, and the latter falls upon the table 25. The slide 7 is thereby liberated coming to rest upon the top of the piece of work. As soon as the work passes the slide 7 the latter in turn falls back upon the table 25 and the protecting guard 5 again occupies the position represented in the drawings thus preventing the hand of the workman from coming into contact with the teeth of the saw. The slide 7 also insures a similar protection in front of the saw. When it is desired to use the saw for making rabbets the bolt 21 is taken away, so that the knife 20 can turn around its axis 22. It is raised by the piece of work at the beginning of the sawing operation and rests upon the top during its progress.

This device has the advantage of surrounding the saw on all sides and thus rendering accidents impossible. On the other hand it is automatically controlled and does not require any special manipulation by the workman. Finally the system allows of the saw being changed without loss of time because this can be accomplished without removing the protective device.

On account of the slots in the support and the plate, the dividing knife and slide can be brought nearer to one another, thus permitting the employment of saws of different diameter.

In the modification of the safety device shown in Fig. 2 and which is to be applied to circular saws, the device always comprises a plate 1, which supports the various parts comprising the protective device. This latter consists of a guard 5 located upon the side of the saw and pivoted upon a pin 26 carried by the slide 7. The guard 5 can move between the plate 1 and two guide bars 6. A cam 27 is pivoted upon the same pin 26 and the guard 5, a washer being interposed between the two. The guide bars 6 carry at one end a pin 28 upon which may be pivoted a side plate 29 of appropriate shape, the lower part of which rests upon the end of the pin 26. The side plate 29 can slide against the guide bars 6 and its displacement in an upward direction is limited by a stop, for example a screw head 30.

The operating means of the safety device comprise essentially a slide 7 moving in a guide on the plate 1. In its upper part the slide 7 carries a pin 8 engaging in a longitudinal slot in an arm 9 pivoted at 10 to the plate 1. This arm carries on its free end a counterpoise 31. The arm 9 is provided at its lower part with a projecting portion 32 which rests upon a cam surface of the arm 33 pivoted at 34 upon the plate 1. The operating lever 11 is pivoted at 14 upon a cam 12 itself pivoted at 13 upon the plate 1. The arm 33 rests upon the cam 12. The device also comprises a dividing knife 20 which is solely maintained in the slot in the plate 1 by two bolts 23. This knife is provided with a curved slot 24 by means of which, according to its proximity to the slide, it may be turned toward the saw with the visible rear curvature of which it thus corresponds. The knife is provided with a notch of the thickness of the bolt so that the latter can be disengaged from the knife and the knife allowed to rest upon the back bolt without it being withdrawn so that wood in which rabbets are being cut can pass underneath the knife.

The device operates in the following manner: When the piece of work is pushed in the direction of the saw, the lever 11 is displaced toward the left and carries with it the cam 12 which by means of arm 33 raises the arm 9 of the slide 7. The guard 5 and the side plate 29 are thus raised and disengaged from the saw. The workman can thus bring the piece of work against the teeth of the saw.

In Fig. 3 are shown certain modifications which can be made in the operating part of the device when the safety device is intended to operate under certain conditions either with or without a guide. The object of these modifications is to bring the operating lever considerably nearer to the slide and to facilitate the raising movement. The operating lever 11 is pivoted at 35 to a link 12, itself pivoted at 36 on the plate 1. Lever 11 carries at its upper right hand end a projecting portion 37 which engages a roller 38 when the wood is pushed toward the saw. At its upper left hand end there is an enlarged portion which acts upon the arm 33 above described. The link 12 rests upon a stop 39 mounted on the plate 1.

When the device operates without a guide it is necessary to surround the saw on all sides in order to obtain proper protection. The saw is then furnished upon its two faces with the protective parts shown in Fig. 2. The operation can be readily understood. The piece of work when pushed toward the saw turns the lever 11, the nose or projecting portion of which comes into engagement with the roller 38 serving as a fulcrum. The lever 11 continues to be displaced by the piece of work and engages with its cam shaped portion the arm 33 which acts upon the controlling arm 9.

Referring now to Fig. 4, the form of construction therein shown is applicable to band or reciprocating saws. The operating lever 11 is pivoted at 40 upon a plate 41 which is itself pivoted at 42 upon the supporting plate 1. This plate 41 which is supported in its lowest position (shown in the drawing) by a stop 43 mounted on the plate 1 is provided with a finger 44. A slide 45 moving in a guide on the plate 1 carries at its lower end a projection 46 which rests upon the finger 44. At the top of the slide there is a finger 47 adapted to support two bars 48 located one on each side of the saw at a suitable distance therefrom. These bars 48 are guided in grooves of a block 49 fixed to the left hand end of the plate 1. Links 50 are pivoted at one end upon the bars 48 and at the other end upon the guards 51 located on both sides of the saw, these links normally rest upon the pins 52 mounted upon the bars 48. The guards 51 are guided in their movement by the bands 53. Side plates 54 preferably made of hard wood and mounted upon the block 49 are likewise located at each side of the saw and in continuation of the guards.

I claim:

1. In a safety device for saws, the combination with a saw, of a supporting plate mounted adjacent to the saw, a guard movably coöperating with the saw teeth, slide means vertically movable on the plate and pivotally associated with the guard, and a controlling lever operatively associated with the slide and actuated by engagement of the piece of work therewith to raise the slide means and the guard, the said controlling lever being released when the work passes out of engagement therewith so as to permit the guard to resume its normal position relatively to the saw teeth.

2. In a device of the class specified, the combination with a saw, a controlling slide having guiding means and a guard pivoted thereon, a pivoted side plate having a portion thereof resting on the slide, a cam held on the slide, an operating lever for the slide, an arm supporting the operating lever, and a cam arm interposed between the operating lever and the arm supporting the slide for raising the latter.

3. In a safety device of the class specified, the combination with a saw, of a supporting plate mounted adjacent to the saw, safety devices carried by the supporting plate and coöperating with the teeth of the saw, and a slotted dividing knife movably mounted at the back of the saw on the supporting plate and longitudinally adjustable to accommodate the formation of rabbets in the work.

In testimony whereof I have hereunto set my hand in presence of two subscribing witnesses.

OTHON TROUPENAT.

Witnesses:
H. C. COXE,
EMILE KLOTZ.

Copies of this patent may be obtained for five cents each, by addressing the "Commissioner of Patents, Washington, D. C."